United States Patent
Kuboshima et al.

(10) Patent No.: US 7,174,706 B2
(45) Date of Patent: Feb. 13, 2007

(54) EXHAUST EMISSION CONTROL SYSTEM FOR INTERNAL COMBUSTION ENGINE

(75) Inventors: Tsukasa Kuboshima, Okazaki (JP); Masumi Kinugawa, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/092,810

(22) Filed: Mar. 30, 2005

(65) Prior Publication Data

US 2005/0217250 A1 Oct. 6, 2005

(30) Foreign Application Priority Data

Apr. 5, 2004 (JP) ............................. 2004-110750

(51) Int. Cl.
*F01N 3/00* (2006.01)
(52) U.S. Cl. ........................... 60/295; 60/280; 60/287; 60/297; 60/311; 60/278
(58) Field of Classification Search ................ 60/278, 60/280, 287, 291, 295, 297, 311
See application file for complete search history.

(56) References Cited

U.S. PATENT DOCUMENTS 6,711,892 B2 * 3/2004 Tamura et al. ................ 60/277
6,758,039 B2 * 7/2004 Kuboshima et al. ........... 60/311
6,962,046 B2 * 11/2005 Kuboshima et al. ........... 60/295
6,966,178 B2 * 11/2005 Saito et al. .................... 60/295
6,969,413 B2 * 11/2005 Yahata et al. ............... 55/282.3
7,028,467 B2 * 4/2006 Kuboshima et al. ........... 60/297
2004/0103648 A1 6/2004 Opris et al. .................... 60/285

FOREIGN PATENT DOCUMENTS

JP 7-332065 12/1995

* cited by examiner

*Primary Examiner*—Binh Q. Tran
(74) *Attorney, Agent, or Firm*—Nixon & Vanderhye, P.C.

(57) ABSTRACT

An exhaust emission control system for an internal combustion engine is located on a vehicle and provided with a particulate filter to accumulate particulate matters in an exhaust gas of the engine. The system has a pressure difference detector, an exhaust flow rate detector, a regeneration controller and a detection accuracy increaser. The pressure difference detector detects a differential pressure in the particulate filter. The exhaust flow rate detector detects an exhaust flow rate of the engine. The regeneration controller determines to regenerate the particulate filter based on the differential pressure and the exhaust flow rate. The detection accuracy increaser increases a detection accuracy of the differential pressure.

10 Claims, 9 Drawing Sheets

EXHAUST EMISSION CONTROL SYSTEM FOR INTERNAL COMBUSTION ENGINE

CROSS REFERENCE TO RELATED APPLICATION

This application is based upon and claims the benefit of priority of Japanese Patent Application No. 2004-110750 filed on Apr. 5, 2004, the content of which is incorporated herein by reference.

FIELD OF THE INVENTION

The present invention relates to an exhaust emission control system for an internal combustion engine provided with a particulate filter for removing particulate matters in an exhaust gas and, more particularly, a system optimized for determining a proper schedule to regenerate the particulate filter.

BACKGROUND OF THE INVENTION

Conventionally, an internal combustion engine adopts an exhaust emission control system such as an oxidation catalyst, nitrogen oxide catalyst, or a three way catalyst, for removing airborne pollutants in an exhaust gas of the engine as a measure for environmental protection. Further, it is a current issue to eliminate particulate matters such as soot and soluble organic fraction (SOF) in the exhaust gas of a diesel engine. Therefore, the exhaust emission control system for the engine has a particulate filter along an exhaust line of the engine. The particulate filter retains the particulate matters by passing the exhaust gas through a porous barrier to accumulate the particulate matters in the exhaust gas thereon.

A large amount of the particulate matters in the particulate filter increases a flow resistance of the exhaust gas and a backpressure of the engine and decreases a power of the engine. Thus, it is necessary to regenerate the particulate filter by burning the particulate matters therein regularly.

Particulate accumulations increase the differential pressure in the particulate filter. Japanese patent document JP-07-332065-A discloses a method for determining a schedule to clean the particulate filter when a differential pressure in the particulate filter exceeds a predetermined value. It is desirable to determine the schedule with both the differential pressure and an exhaust flow rate because the differential pressure also depends on the exhaust flow rate.

However, both the exhaust flow rate and the differential pressure fluctuate making it difficult to accurately estimate the amount of the particulate matters in the particulate filter.

Providing a low estimate of the amount of particulate may cause an increase in backpressure of the engine and a decrease in engine power, as described above. Furthermore, the rapid burning of the large amount of the particulate matters deteriorates the particulate filter fast. Providing a high estimate of the amount increases the time of burning the particulate matters and wears the particulate filter fast, thereby causing it to be replaced.

A sensor system for estimating the particulate amount with high accuracy increases a manufacturing cost.

SUMMARY OF THE INVENTION

The object of the present invention, in view of the above issues, is to provide an exhaust emission control system for an internal combustion engine that can clean a particulate filter provided with the engine according to a proper schedule without an excessive cost increase.

To achieve the above object, an exhaust emission control system according to the present invention is for an internal combustion engine and located on a vehicle and provided with a particulate filter to accumulate particulate matters in an exhaust gas of the engine. The system has a pressure difference detector, an exhaust flow rate detector, a regeneration controller, and a detection accuracy increaser. The pressure difference detector detects a differential pressure in the particulate filter. The exhaust flow rate detector detects an exhaust flow rate of the engine. The regeneration controller determines to regenerate the particulate filter based on the differential pressure and the exhaust flow rate. The detection accuracy increaser increases a detection accuracy of the differential pressure.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DESCRIPTION OF THE PREFERRED EMBODIMENTS

Figure 1:
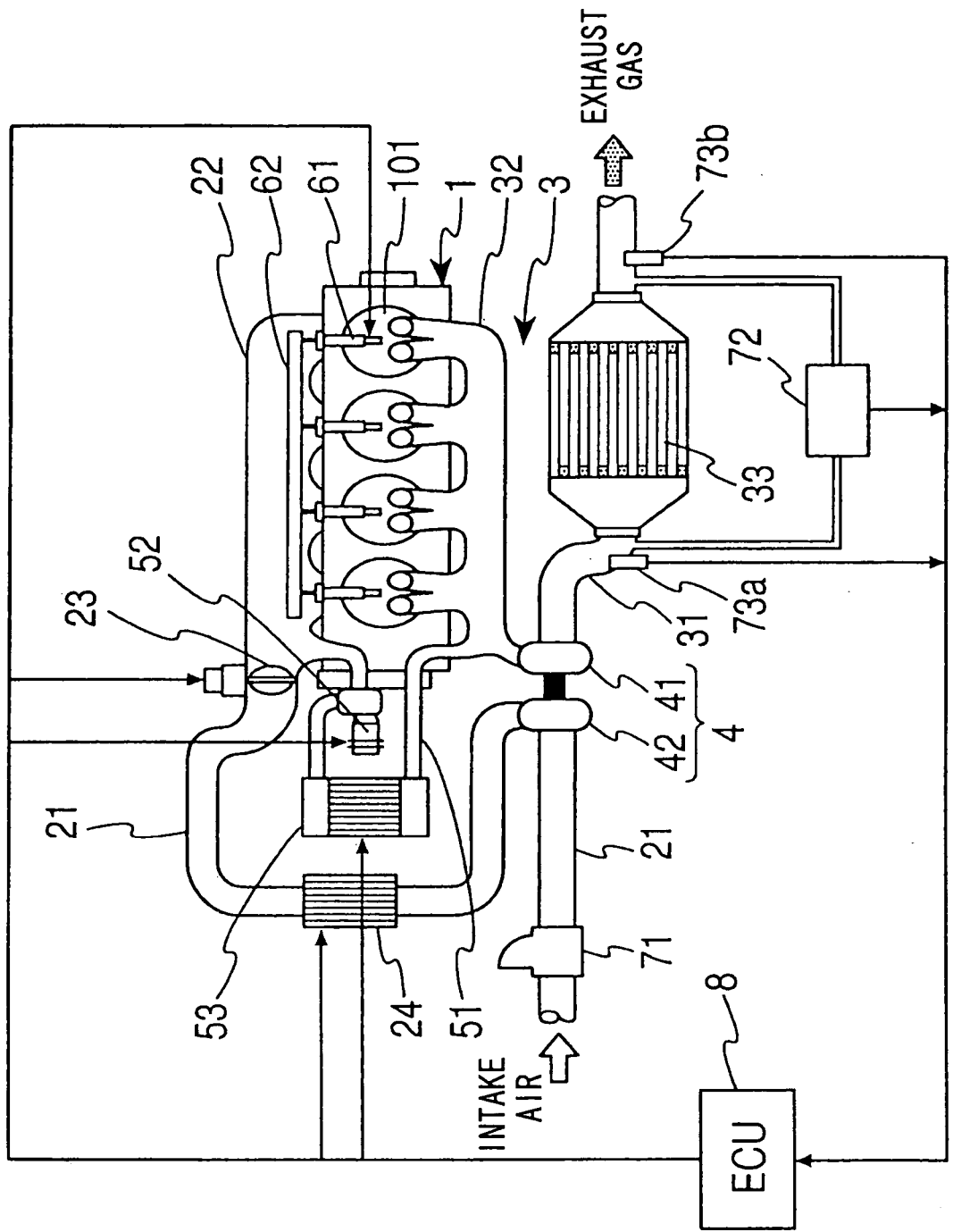
FIG. 1 is a schematic view showing an entire structure of an internal combustion engine having an exhaust emission control system according to a first embodiment of the present invention.

The first embodiment of the present invention, as shown in FIG. 1, has an exhaust emission control system for removing particulate matters in an exhaust gas of a diesel engine (an internal combustion engine) 1. The engine 1 has a plurality of fuel injectors 61 and a common rail 62 in communication with each of the fuel injectors 61. The fuel injectors 61 inject a fuel supplied from the common rail 62 into combustion chambers of cylinders of the engine 1.

An intake pipe 21 and an intake manifold 22 of the engine 1 are connected to each other. An intake throttle valve 23 is interposed between the intake pipe 21 and the intake manifold 22 for adjusting an intake flow rate. The intake pipe 21 has an airflow meter 71 for detecting the intake flow rate.

An exhaust gas of the engine 1 flows out of exhaust ports 101 of the engine 1 and through an exhaust passage 3. The exhaust passage 3 includes an exhaust pipe 31 and an exhaust manifold 32 connected to each other. The exhaust pipe 31 is provided with a diesel particulate filter (DPF) 33.

The DPF 33 has a conventional structure. Specifically, the DPF 33 has a honeycomb construction made of heat-resistant ceramics such as cordierite. Porous walls partition an inner room of the DPF 33 into a number of tubular cells. The tubular cells are alternately blocked at any one of an inlet and an outlet. Thus, the exhaust air flows into the inlet of one tubular cell, passes through the porous wall into another tubular cell contiguous to the one tubular cell and flows out of the outlet of another tubular cell. The porous wall captures the particulate matters in the exhaust gas passing therethrough. Desirably, the porous walls support catalysts to promote an oxidization of the particulate matters accumulated thereon to be burnt and removed at a relatively low temperature.

The exhaust pipe 31 is provided with a turbine 41 upstream of the DPF 33. The intake pipe 21 is provided with a compressor 42. A shaft connects the turbine 41 and the compressor 42 to form a centrifugal supercharger 4, so that a thermal energy of the exhaust gas drives the compressor 42 to compress the intake air taken in the intake pipe 21. The intake pipe 21 is also provided with a cooler 24 to cool the intake air heated by a compression process by the compressor 42.

An exhaust gas recirculation (EGR) passage 51 connects the intake manifold 22 and the exhaust manifold 32 to recirculate a part of the exhaust gas (EGR gas) into the intake air. The EGR passage 51 is provided with an EGR valve 52 at its exit in connection with the intake manifold 22. The EGR valve 52 adjusts an amount of the EGR gas by its opening degree. The EGR passage 51 is also provided with an EGR cooler 53 to cool the EGR gas merging into the intake air.

The exhaust pipe 31 is provided with a pressure difference sensor 72 to detect a differential pressure in the DPF 33. The pressure difference sensor 72 serves to estimate an amount of the particulate accumulations (a particulate matter amount) in the DPF 33. A pair of pressure introduce pipes connects the pressure difference sensor 72 and the inlet and the outlet of the DPF 33, and the pressure difference sensor 72 outputs an electric signal in accordance with a differential pressure across the DPF 72.

The exhaust pipe 31 is also provided with a pair of temperature sensors 73a, 73b at the inlet and the outlet of the DPF 33 to detect a temperature of the exhaust gas (an exhaust temperature) flowing through the DPF 33, which represents the temperature of the DPF 33. The exhaust temperature can be derived from temperatures detected by the sensors 73a, 73b by such a calculation process as a first order filter or an averaging filter.

An electronic control unit (ECU) 8 receives output signals from the airflow meter 71, the pressure difference sensor 72, and the temperature sensors 73a, 73b. The ECU 8 also receives output signals from an assortment of sensors for detecting an opening degree of the EGR valve 52, a rotational frequency of the engine 1, a vehicle speed, a cooling water temperature, a throttle angle, a crank angle, a fuel pressure and so on. The ECU 8 estimates operational states of respective portions of the engine 1 based on these output signals. Then the ECU 8 determines a fuel injection quantity and an EGR quantity in accordance with an operational state of the engine 1 and operates a throttle valve 23, the fuel injectors 61, and the EGR valve 52 via a feedback control.

Further, the ECU 8 calculates the particulate matter amount with the intake flow rate detected by the airflow meter 71 and the differential pressure detected by the pressure difference sensor 72. The ECU 8 calculates the particulate matter amount with a positive correlation between the amount of the particulate accumulations and the differential pressure. Then, the ECU 8 performs a regeneration process of the DPF 33 to burn and remove the particulate accumulations when the particulate matter amount exceeds a predetermined threshold value.

Specifically, to regenerate the DPF 33, the exhaust temperature is increased via a post-injection after a main-injection or a delayed injection to decrease a heat cycle efficiency of the engine 1 and increase the exhaust temperature. The exhaust temperature can be increased also by decreasing an opening degree of the intake throttle valve 23 to decrease the intake flow rate and a thermal capacity of the combustion gas supplied into the cylinder.

Figure 2:
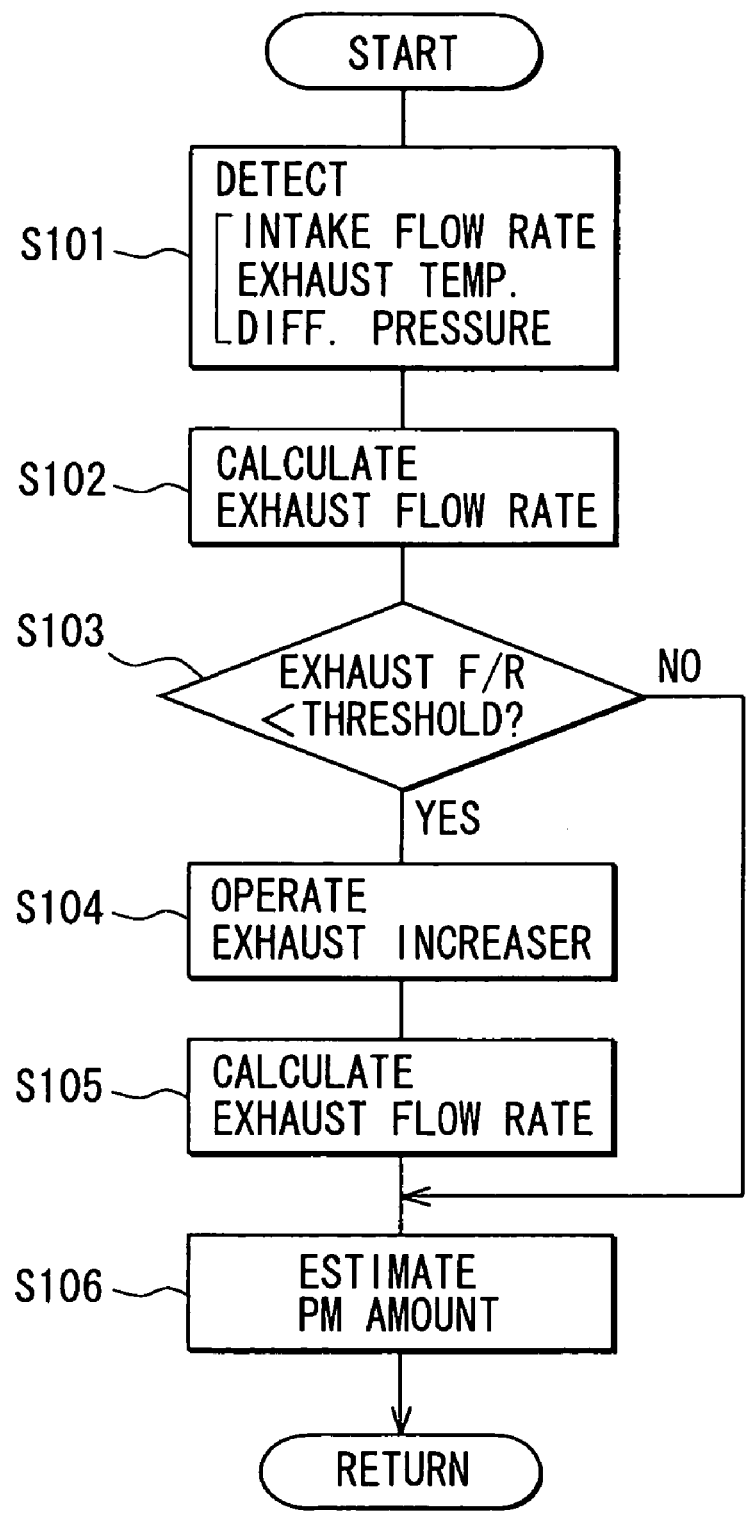
FIG. 2 is a flowchart showing a cleaning process performed by an ECU for a particulate filter in the first embodiment.

FIG. 2 depicts a control process for the regeneration of the DPF 33. In step S101, the ECU 8 detects the intake flow rate, exhaust temperature, and differential pressure. In step S102, the ECU 8 calculates the exhaust flow rate with the intake flow rate, the exhaust temperature, and the differential pressure. In this calculation, the intake flow rate is converted from mass to volume and the volume is corrected based on the exhaust temperature and the differential pressure.

Figure 3:
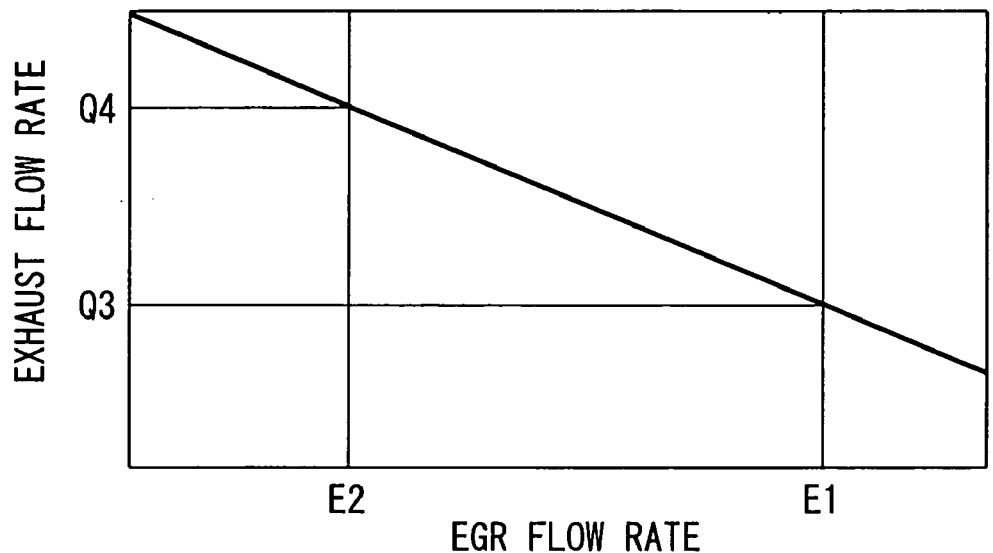
FIG. 3 is a graph illustrating a first operational relationship of the exhaust emission control system of the first embodiment.

In step S103, the ECU 8 determines whether the exhaust flow rate is within a threshold value or not. If Yes in step S103, the ECU 8 determines in step S104 to increase the exhaust flow rate by decreasing the opening degree of the EGR valve 52. FIG. 3 depicts the relation between the EGR flow rate and the exhaust flow rate. As the EGR flow rate decreases, the exhaust flow rate increases.

In step S105, the ECU 8 calculates the exhaust flow rate again. In this step, the exhaust flow rate is calculated by detecting the intake flow rate, the exhaust temperature, and the differential pressure to derive the current exhaust flow rate and differential pressure.

In step S106, the ECU 8 estimates a particulate matter amount. Specifically, the ECU 8 inputs the exhaust flow rate and the differential pressure into a map and/or a function for the estimation. Then the control process returns to the start.

If No in step S103, the process skips steps S104 and S105 and goes directly to step S106. In this case, the particulate matter amount is estimated based on the exhaust flow rate that is not increased by the step S104 and the corresponding differential pressure. It should be appreciated that while the process in FIG. 2 has been described as including a plurality of "steps," these "steps" are not limited to being performed in the sequence disclosed herein, but rather may be performed in alternative sequences or with alternative and/or supplemental steps.

Figure 4:
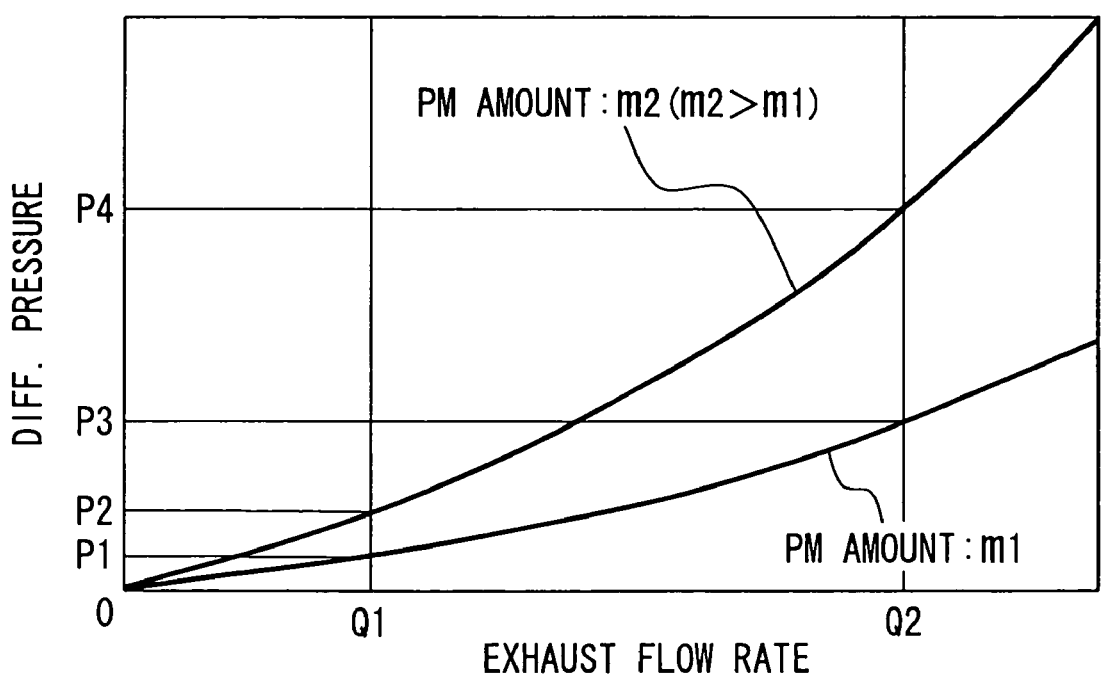
FIG. 4 is a graph illustrating a second operational relationship of the exhaust emission control system of the first embodiment.

The above-described control process brings the following effects. FIG. 4 depicts a relation between the exhaust flow rate and the differential pressure. As the exhaust flow rate increases and as the particulate accumulation amount increases, the differential pressure increases. When the exhaust flow rate is large (Q2 in FIG. 4), an accumulation increase of the particulate matters from m1 to m2 causes an increase (P–P3) in the differential pressure. When the exhaust flow rate is small (Q1 in FIG. 4), the accumulation increase of the particulate matters from m1 to m2 causes an increase (P2–P1) in the differential pressure, which is quite smaller than (P4–P3) when the exhaust flow rate is Q2. The detection signal of the small differential pressure is susceptible to a noise in the signal and causes a large error in the estimation of the particulate matter amount.

Figure 5:
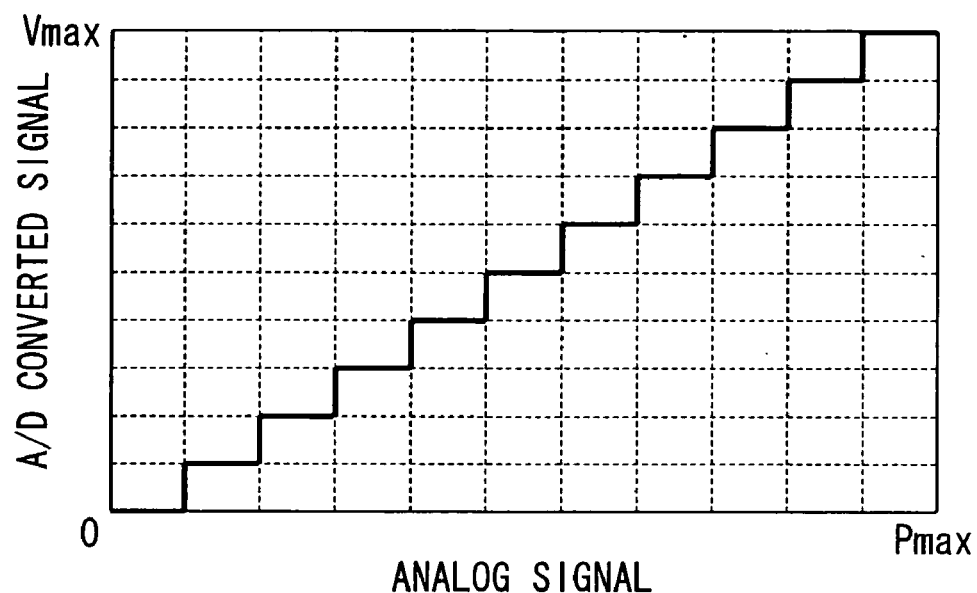
FIG. 5 is a graph illustrating a third operational relationship of the exhaust emission control system of the first embodiment.

An analog-to-digital (A/D) conversion by a microcomputer in the ECU 8 converts an analog output signal (voltage) of the pressure difference sensor 72, which is in proportion with the differential pressure in the DPF 33, into a digital output signal (voltage). The differential pressure is calculated by multiplying the digital output signal by a predetermined coefficient. FIG. 5 depicts the relation between the analog output signal of the pressure difference sensor 72 and the digital output signal converted by the ECU 8.

The A/D conversion outputs discrete output signals, of which a minimum interval determines a resolution and an error of the A/D conversion.

For example, when the A/D conversion has a resolution of 10 bits and converts the analog output signal of the pressure difference sensor 72 between 0 and Pmax into a digital output signal between 0 and Vmax, the resolution of the output signal will be (Vmax/1024). Thus, when the differential pressure is not sufficiently large such as Q1 in FIG. 4, the differential pressure includes a large error.

The exhaust emission control system of the first embodiment can estimate the particulate matter amount in the DPF 33 with high accuracy by increasing the exhaust flow rate to generate a sufficient differential pressure in the DPF 33 for the estimation when the exhaust flow rate is not sufficiently large. Thus, it is possible to operate regeneration processes of the DPF 33 only when the particulate matter amount in the DPF 33 is over a given value.

Figure 6:
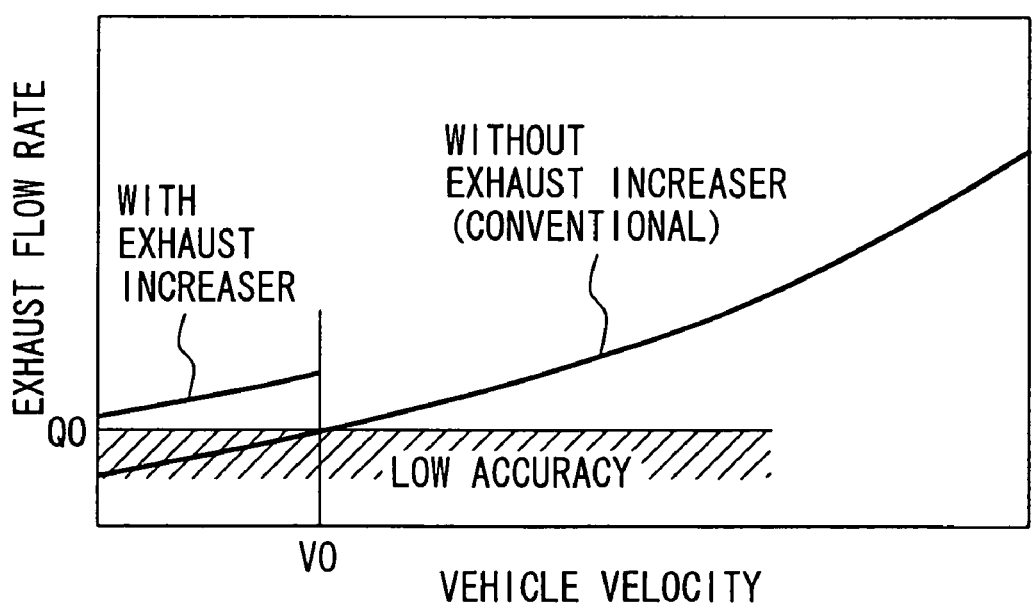
FIG. 6 is a graph illustrating a fourth operational relationship of the exhaust emission control system of the first embodiment.

FIG. 6 depicts a relation between a vehicle velocity and the exhaust flow rate. As the vehicle velocity increases, the rotational frequency of the engine 1 and the exhaust flow rate decrease. Conventionally, when the vehicle velocity is small, the accuracy of the differential pressure is too low to secure the estimation accuracy of the particulate matter amount. The exhaust emission control system in this embodiment increases the exhaust flow rate when the vehicle velocity is smaller than Vo and the exhaust flow rate is smaller than Q0 that is a minimum exhaust flow rate for securing the accuracy of the differential pressure. Thus, the exhaust emission control system can estimate the particulate matter amount in the DPF 33 with high accuracy.

Instead of closing the EGR valve as described above, such a measure as closing an intake throttle valve, closing a variable turbocharger's nozzle, a post-injection, or decreasing the transmission gear ratio also increases the exhaust flow rate.

Closing the intake throttle valve or closing the variable turbocharger's nozzle increases the intake flow rate and the exhaust flow rate.

The post-injection increases the exhaust temperature so that an expansion of the exhaust gas with temperature increases the exhaust flow rate. The post-injection is executed by the fuel injectors 61 disposed in the cylinders of the engine 1. Alternatively, a fuel injector may be disposed within a component of the exhaust passage 3 to supply a flammable material to the exhaust gas to increase the exhaust temperature.

Decreasing the transmission gear ratio makes the rotational frequency of the engine 1 large to increase the exhaust flow rate. These measures can be adopted selectively or in combination with each other.

Figure 7:
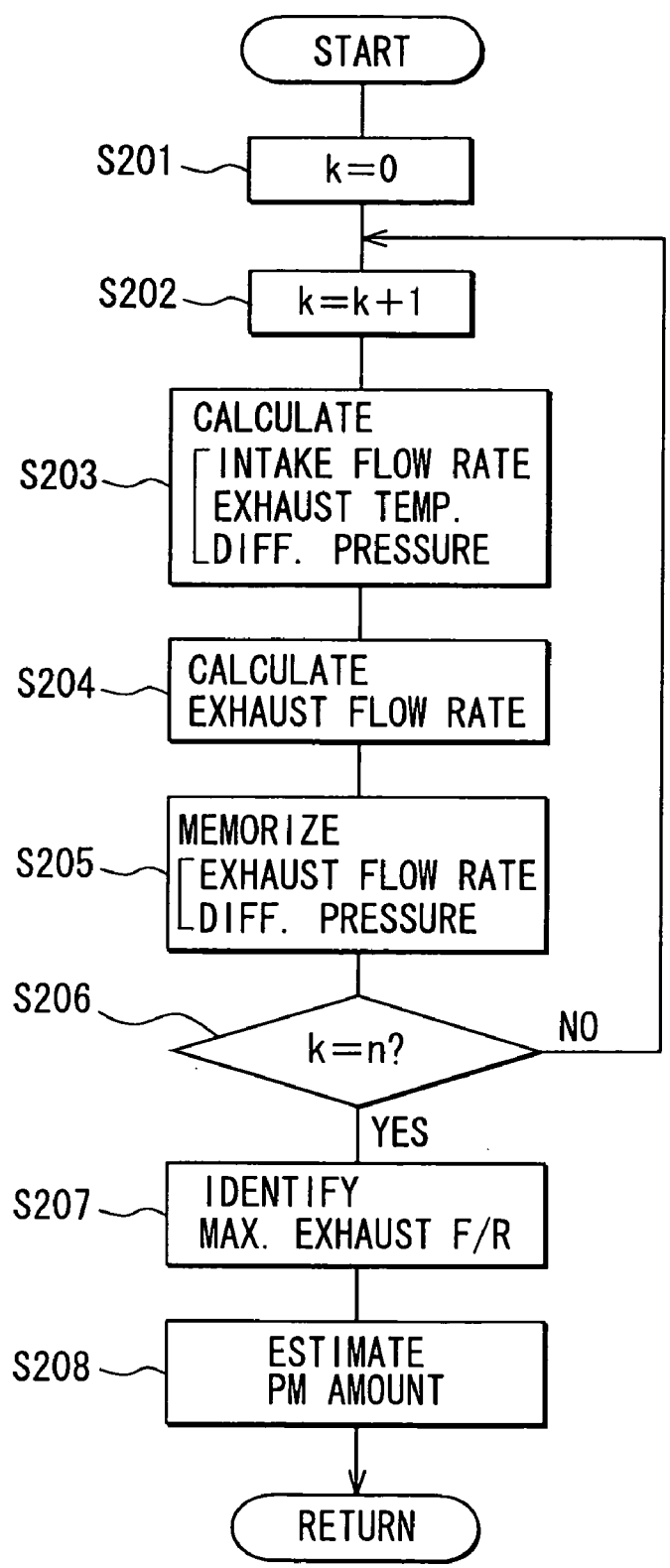
FIG. 7 is a flowchart showing a cleaning process performed by an ECU for a particulate filter in a second embodiment of the present invention.

The second embodiment of the present invention removes particulate matters in the DPF 33 by a control process shown in FIG. 7.

In steps S201 to S207, the ECU 8 identifies a maximum exhaust flow rate during a predetermined time. In step S201, the ECU 8 sets a variable k to zero. In step S202, the ECU 8 increments the variable k by one.

In steps S203, the ECU 8 detects the intake flow rate, the exhaust temperature, and the differential pressure. In step S204, the ECU 8 calculates the exhaust flow rate with the intake flow rate, the exhaust temperature, and the differential pressure. The steps S203 and S204 are substantially the same as the steps S101 and S102 in the first embodiment.

In step S205, the ECU 8 stores the exhaust flow rate in a RAM provided in the ECU 8. The RAM is configured to be able to store n pairs of the exhaust flow rates and the differential pressures as described below, wherein n denotes a constant number.

In step S206, the ECU 8 determines whether the variable k is equal to n or not. If No in the step S206, the control process returns to the step S202 and repeats calculating the exhaust flow rate and storing the exhaust flow rate and the differential pressure in the steps S202 to S206 until the variable k becomes equal to n. The repeated steps S203 are periodically executed.

If Yes in the step S206, the process goes to step S207. In the step S207, the ECU 8 identifies a maximum exhaust flow rate among n series of the exhaust flow rates stored in the RAM. In determining the maximum exhaust flow rate, the ECU 8 sets a provisional maximum exhaust flow rate to one of the n series of the exhaust flow rates. Then the ECU 8 compares the one and the others of the n series of exhaust flow rates. Every time when any one among the others is larger than the one, the ECU 8 sets the provisional maximum value to the any one.

In step S208, the ECU 8 estimates the particulate matter amount with the maximum exhaust flow rate and the differential pressure corresponding to the maximum exhaust flow rate. Then the process returns to the start. It should be appreciated that while the process in FIG. 7 has been described as including a plurality of "steps," these "steps" are not limited to being performed in the sequence disclosed herein, but rather may be performed in alternative sequences or with alternative and/or supplemental steps.

The maximum exhaust flow rate is the maximum of the n series of exhaust flow rates periodically detected during the predetermined time, that is, n×(predetermined period). Thus, even if the exhaust flow rate varies in the predetermined time by an operational state of the engine 1, the particulate matter amount is assumed with the maximum exhaust flow rate and the corresponding differential pressure. Accordingly, the exhaust emission control system can prevent the estimation of the particulate accumulation amount from being estimated with low accuracy even if the exhaust flow rate fluctuates and temporarily becomes small during the predetermined time.

Figure 8:
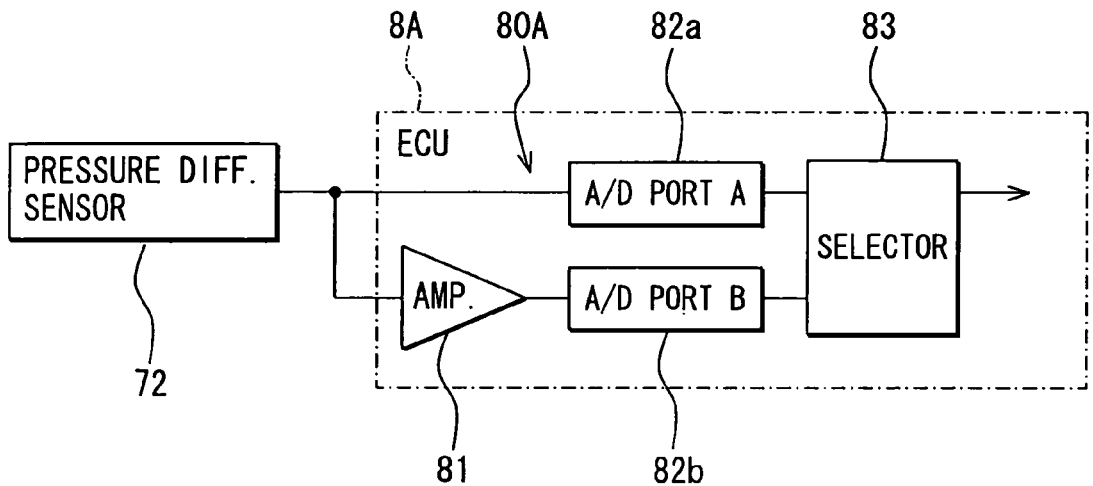
FIG. 8 is a block diagram of a principal portion of an ECU in an exhaust emission control system according to a third embodiment of the present invention.

FIG. 8 depicts a third embodiment of the present invention having an ECU 8A that has a different configuration from that of the ECU 8 in the first embodiment for removing particulate matters in the DPF 33. FIG. 8 depicts a signal processing unit 80A in the ECU 8A.

The signal processing unit 80A can change an input-to-output ratio of the signal. Specifically, the signal processing unit 80A has two A/D ports A 82a and B 82b. The A/D port A 82a directly takes an analog output signal (voltage) of the pressure difference sensor 72. The A/D port B 82b takes the analog output signal amplified by an amplifier 81 having a predetermined transmission gain larger than 1 (approximately 2, for example). The selector 83 is for selecting any one of the analog output signals of the A/D ports A 82a and B 82b and outputs the selected analog output signal to an A/D transformer (not shown).

The pressure difference sensor 72 has a detection range between 0 and Pmax. The A/D transformer can take voltages between 0 and Vmax. The ECU 8A converts the signal of the analog output signal of the pressure difference sensor 72 between 0 and Pmax into a digital output signal (voltage) between 0 and Vmax, as shown in FIG. 5. The output voltage of the ECU 8A when the selector 83 selects the A/D port B 82b is naturally larger than that when the selector 83 selects the A/D port A 82a.

Figure 9:
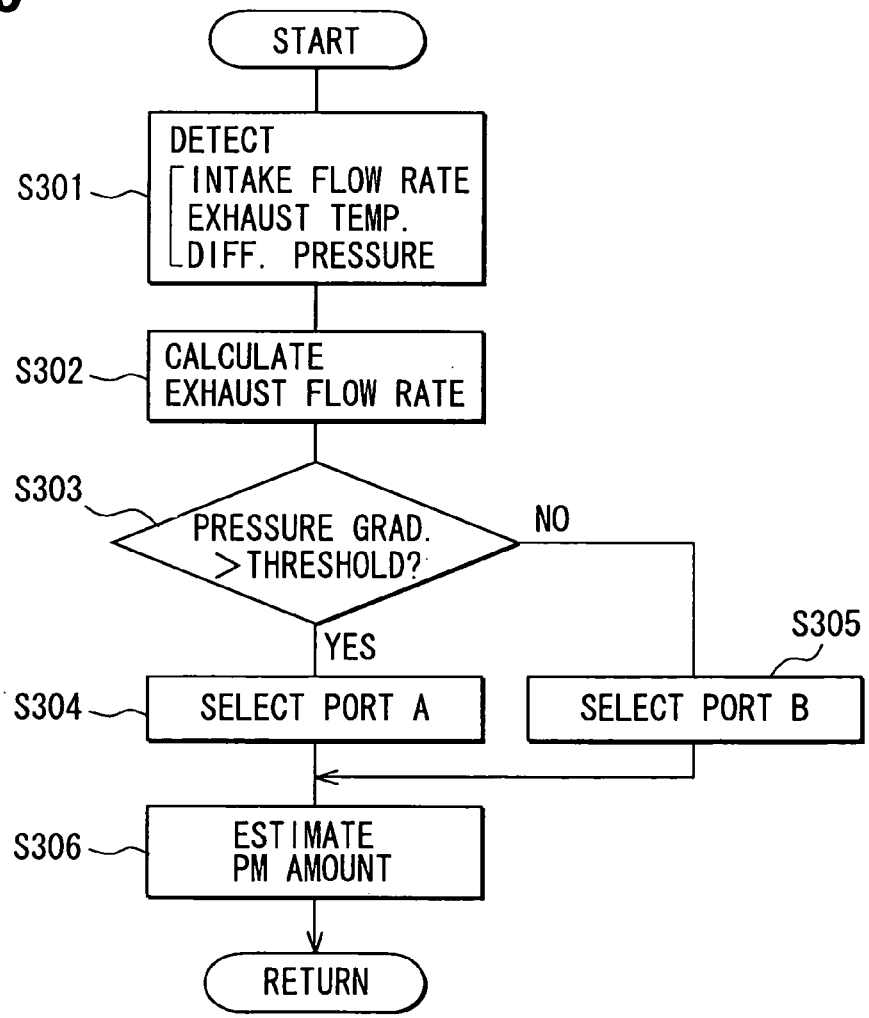
FIG. 9 is a flowchart showing a regeneration control process performed by the ECU in the exhaust emission control system according to the third embodiment.

FIG. 9 depicts the control process by the ECU 8A having the selector 83 to remove particulate matters in the DPF 33. In steps S301 and S302, the ECU 8A detects the intake flow rate, the exhaust temperature and the differential pressure and calculates the exhaust flow rate with the intake flow rate, the exhaust temperature, and the differential pressure. The steps S301 and S302 are substantially the same as the steps S101 and S102 in the first embodiment. In the step S301 of the third embodiment, however, the A/D ports A 82a and B 82b output two analog output signals derived from one analog output signal of the pressure difference sensor 72.

The differential pressure in the DPF 33 is calculated as a first product of the signal of the A/D port A 82a and a first coefficient or a second product of the signal of the A/D port B 82b and a second coefficient. The first coefficient is larger than the second coefficient (approximately 2, for example).

In step S303, the ECU 8A sets the differential pressure to the first product and determines whether the differential pressure is larger than a predetermined threshold value P0 (refer to FIG. 10) or not.

If Yes in step S303, the process goes to step S304 in which the ECU 8A sets the differential pressure to the first product, which is a product of the signal of the A/D port A 82a and the first coefficient. Then the process goes to step S306.

If No in step S303, the process goes to step S305. In the step S305, the ECU 8A sets the differential pressure to the second product, which is a product of the signal of the A/D port B 82b and the second coefficient. Then the process goes to the step S306.

In step S306, the ECU calculates the particulate matter amount with the exhaust flow rate and the differential pressure. Then the process returns to the start. It should be appreciated that while the process in FIG. 9 has been described as including a plurality of "steps," these "steps" are not limited to being performed in the sequence disclosed herein, but rather may be performed in alternative sequences or with alternative and/or supplemental steps.

When the differential pressure is lower than the predetermined threshold value P0, the differential pressure is calculated with a signal of the pressure difference sensor 72 that is amplified by the amplifier 81.

Figure 10:
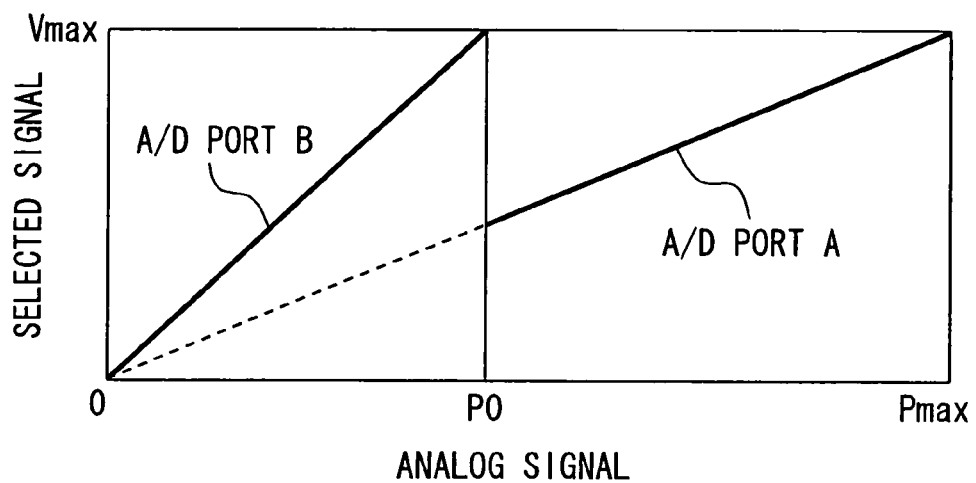
FIG. 10 is a graph showing an operational relationship of the exhaust emission control system according to the third embodiment.

FIG. 10 depicts a relation between the analog output voltage of the pressure difference sensor 72 and the digital output signal converted by the ECU 8A. A solid line in FIG. 10 shows the signal selected by the selector 83 in the step S304 or S306, which is used in estimating the particulate accumulation amount. P0 is set to an output value of the pressure difference sensor 72 when the signal of the A/D port B 82b is equal to Vmax or slightly smaller than Vmax. That is, the selector 83 selects the signal of the A/D port A 82a when the output voltage of the pressure difference sensor 72 is not smaller than P0 and selects the signal of the A/D port B 82b when the output voltage of the pressure difference sensor 72 is smaller than P0.

Thus, the exhaust emission control system of the third embodiment raises the accuracy of the analog output voltage of the pressure difference sensor 72 by (P0/Pmax) times when the analog output voltage is not sufficiently large for estimating the particulate accumulation amount. Accordingly, the system can estimate the particulate accumulation amount with high accuracy even when the exhaust flow rate is not sufficiently large for the estimation.

Alternatively, the process of the step S303 may be done as a comparison of the exhaust flow rate and a threshold value.

Figure 11:
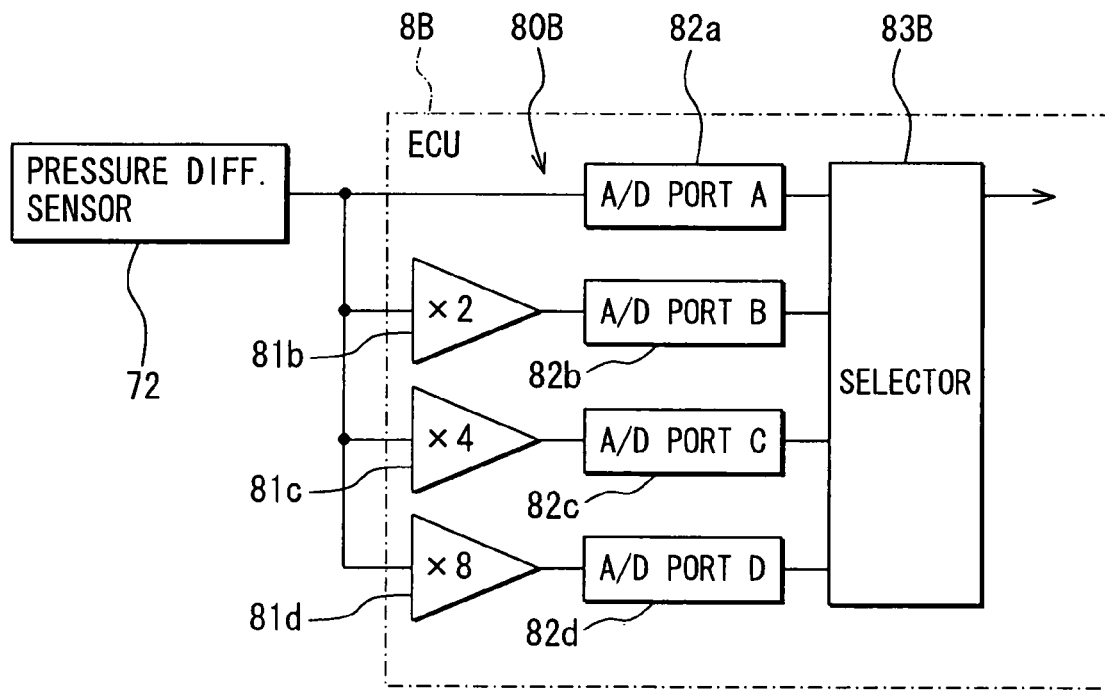
FIG. 11 is a block diagram of a principal portion of an ECU in an exhaust emission control system according to a fourth embodiment of the present invention.

FIG. 11 depicts a fourth embodiment of the present invention having an ECU 8B that has a different configuration from the ECU 8A in the third embodiment for removing particulate matters in the DPF 33. FIG. 11 schematically depicts a signal processing unit 80B in the ECU 8B.

The signal processing unit 80B can change an input-to-output ratio of the signal. Specifically, the signal processing unit 80B has four A/D ports A 82a to D 82d. The A/D port A 82a directly takes an analog output signal (voltage) of the pressure difference sensor 72. The A/D ports B 82b to D 82d each take the analog output signal amplified by an amplifier 81b, 81c or 81c respectively. Transmission gains of the amplifiers 81b to 81d are set to 2, 3 and 4 respectively. A selector 83B is for selecting any one of the analog output signals of the A/D ports A 82a to D 82d and outputs the selected analog output signal to an A/D transformer (not shown).

Figure 13:
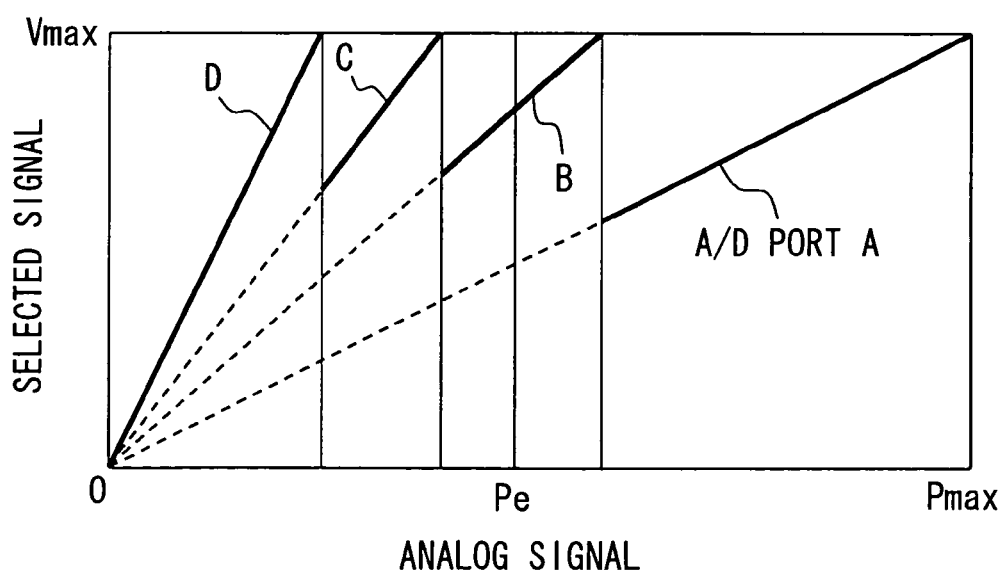
FIG. 13 is a graph showing an operational relationship of the exhaust emission control system according to the fourth embodiment.

The pressure difference sensor 72 has a detection range between 0 and Pmax. The A/D transformer can take voltages between 0 and Vmax. The ECU 8B converts the analog output signal of the pressure difference sensor 72 between 0 and Pmax into a digital output signal (voltage) between 0 and Vmax as shown in FIG. 13.

Figure 12:
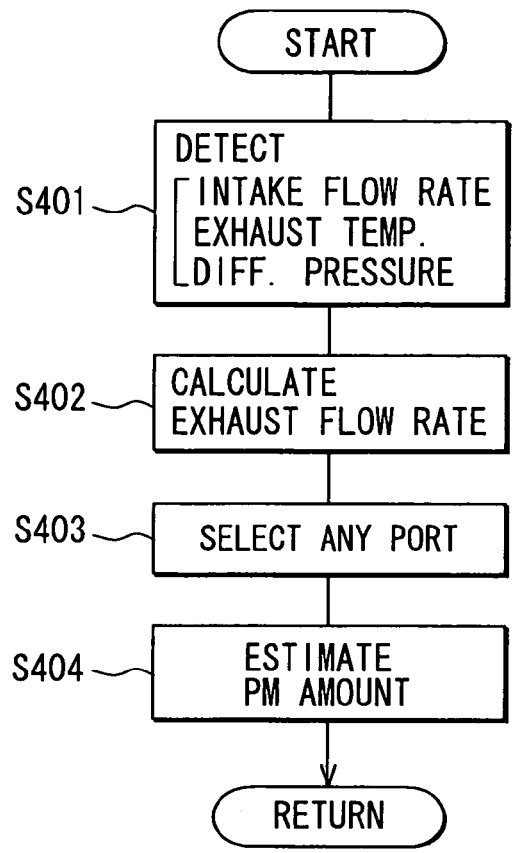
FIG. 12 is a flowchart showing a regeneration control process performed by the ECU in the exhaust emission control system according to the fourth embodiment.

FIG. 12 depicts a control process performed by the ECU 8B having the selector 83B to remove particulate matters in the DPF 33. In steps S401 and S402, the ECU 8B detects the intake flow rate, the exhaust temperature and the differential pressure and calculates the exhaust flow rate with the intake flow rate, the exhaust temperature and the differential pressure. The steps S401 and S402 are substantially as same as the steps S101 and S102 in the first embodiment. In the step S401 of the fourth embodiment, however, the A/D ports A 82a to D 82d output four analog output signals derived from one analog output signal of the pressure difference sensor 72.

The differential pressure in the DPF 33 is calculated at a first product of the signal of the A/D port A 82a and a first coefficient, a second product of the signal of the A/D port B 82b and a second coefficient, a third product of the signal of the A/D port C 82c and a third coefficient or a fourth product of the signal of the A/D port D 82*d* and a fourth coefficient. The second, third and fourth coefficients each are set to ½, ¼, ⅛ of the first coefficient.

In step S403, the ECU 8B operates the selector 83B to select any one of the signals of the A/D ports A 82*a* to D 82*d* and to output the selected signal to the A/D transformer. Specifically, the selector 83B selects a signal smaller than Vmax and largest among the signals of the A/D ports A 82*a* to D 82*d*.

Thus, as shown in FIG. 13, the signal selected in the step S403 is a largest one having the highest resolution among the signals of the A/D ports A 82*a* to D 82*d* that the AND transformer can take. Then, the ECU 8B can estimate the particulate accumulation amount with high accuracy regardless of the magnitude of the differential pressure.

In step S404, the ECU 8B calculates the particulate accumulation amount with the exhaust flow rate and the differential pressure. Then the process returns to the start. It should be appreciated that while the process in FIG. 12 has been described as including a plurality of "steps," these "steps" are not limited to being performed in the sequence disclosed herein, but rather may be performed in alternative sequences or with alternative and/or supplemental steps.

Accordingly, the system of the fourth embodiment can estimate the particulate accumulation amount with high accuracy even when the exhaust flow rate is not sufficiently large for the estimation.

Figure 14:
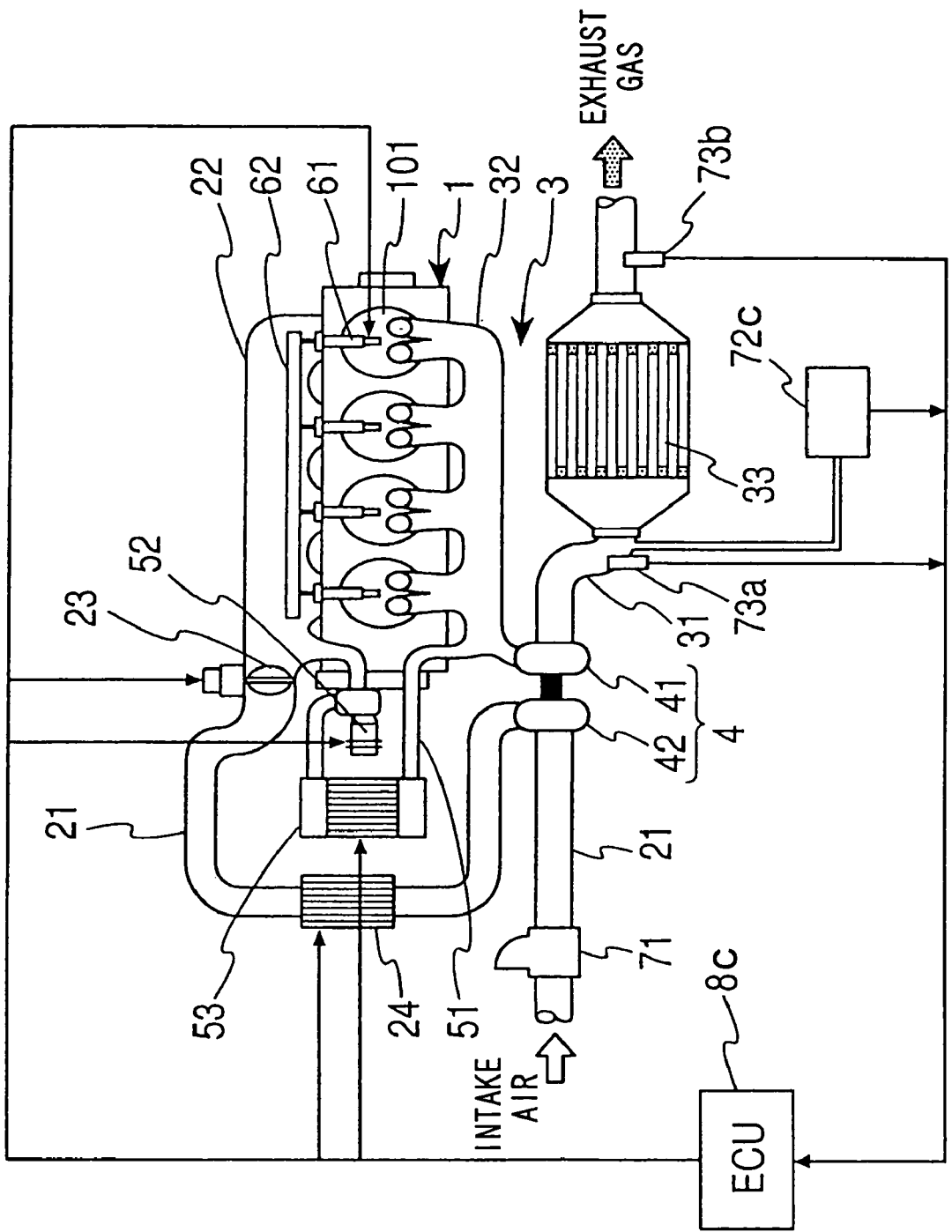
FIG. 14 is a schematic view showing an entire structure of an exhaust emission control system according to a fifth embodiment of the present invention.

FIG. 14 schematically depicts an exhaust emission control system of a fifth embodiment of the present invention.

The pressure sensor 72C is for detecting the exhaust pressure upstream of the DPF 33. An ECU 8C calculates a differential pressure across the DPF 33 by a difference of the exhaust pressure from the pressure downstream of the DPF 33, which is a summation of the atmospheric pressure and a pressure drop between the DPF 33 and an exit of an exhaust pipe. The pressure drop can be calculated also by a function of the exhaust flow rate.

The above-described method in the fifth embodiment for determining the differential pressure in the DPF 33 can be applicable also in the second to fourth embodiments.

The third and fourth embodiments may adopt the above-described structure and/or method of the fifth embodiment for detecting the differential pressure in the DPF 33.

In the third and fourth embodiments, the input-to-output radio of the signal are adjusted by selecting a signal among signals of a plurality of A/D ports, however, an amplifier having a variable gain can be used instead of the plurality of the amplifiers 81, 81*b* to 81*d*, the A/D ports 82*a* to 82*d* and the selector 83, 83B.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. An exhaust emission control system for an internal combustion engine located on a vehicle and provided with a particulate filter to accumulate particulate matters in an exhaust gas of the engine, the system comprising:
    a pressure difference detector for detecting a differential pressure across the particulate filter;
    an exhaust flow rate detector for detecting an exhaust flow rate of the engine;
    a regeneration controller for determining to regenerate the particulate filter based on the differential pressure and the exhaust flow rate; and
    a detection accuracy increaser for increasing a detection accuracy of the differential pressure when the exhaust flow rate is at most equal to a predetermined flow rate.

2. The system according to claim 1, wherein the detection accuracy increaser increases the exhaust flow rate when the exhaust flow rate is lower than a predetermined threshold value and when the regeneration controller determines.

3. The system according to claim 1, wherein the detection accuracy increaser identifies a maximum exhaust flow rate among a series of exhaust flow rates periodically detected by the exhaust flow rate detector and makes the regeneration controller determine based on the maximum flow rate and the differential pressure corresponding to the maximum flow rate.

4. An exhaust emission control system for an internal combustion engine located on a vehicle and provided with a particulate filter to accumulate particulate matters in an exhaust gas of the engine, the system comprising:
    a pressure difference detector for detecting a differential pressure across the particulate filter;
    an exhaust flow rate detector for detecting an exhaust flow rate of the engine;
    a regeneration controller for determining to regenerate the particulate filter based on the differential pressure and the exhaust flow rate; and
    a detection accuracy increaser for increasing a detection accuracy of the differential pressure;
    wherein the detection accuracy increaser has an amplifier for amplifying an output signal of the pressure difference detector when the regeneration controller determines and when the differential pressure is lower than a predetermined threshold differential pressure or the exhaust flow rate is lower than a predetermined threshold exhaust flow rate.

5. An exhaust emission control system for an internal combustion engine located on a vehicle and provided with a particulate filter to accumulate particulate matters in an exhaust gas of the engine, the system compilsing:
    a pressure difference detector for detecting a differential pressure across the particulate filter;
    an exhaust flow rate detector for detecting an exhaust flow rate of the engine;
    a regeneration controller for determining to regenerate the particulate filter based on the differential pressure and the exhaust flow rate; and
    a detection accuracy increaser for increasing a detection accuracy of the differential pressure;
    wherein the pressure difference detector detects the differential pressure with a pressure upstream of the particulate filter and an pressure loss between the particulate filter and an outlet where the exhaust gas is released into an outer air.

6. The system according to claim 2, wherein the detection accuracy increaser increases the exhaust flow rate by at least one operation of:
    decreasing an opening degree of an EGR valve of the engine;
    decreasing an opening degree of an intake throttle valve of the engine;
    increasing an opening degree of a nozzle of a variable turbocharger of the engine;
    a post-injection of the engine; and
    decreasing a transmission gear ratio of the vehicle.

7. The system according to claim 4, wherein the detection accuracy increaser increases a gain of the amplifier when the differential pressure is smaller than a predetermined value.

8. The system according to claim 4, wherein the detection accuracy increaser increases a gain of the amplifier insofar as the differential pressure is within the predetermined threshold differential pressure.

9. A regeneration controller for removing particulate matters accumulated in a particulate filter provided in an internal combustion engine, the controller comprising:
- a pressure difference detector for detecting a differential pressure in the particulate filter;
- an exhaust flow rate detector for detecting an exhaust flow rate of the engine;
- a regeneration controller for determining to regenerate the particulate filter based on the differential pressure and the exhaust flow rate; and
- a detection accuracy increaser for increasing a detection accuracy of the differential pressure.

10. A method of removing particulate matters accumulated in a particulate filter provided in an internal combustion engine comprising:
- detecting a differential pressure across the particulate filter;
- detecting an exhaust flow rate of the engine;
- removing the particulate matters accumulated in the particulate filter based on the differential pressure and the exhaust flow rate; and
- increasing a detection accuracy of the differential pressure by one of increasing the exhaust flow rate of the engine and amplifying the differential pressure.

* * * * *